Figure 1:
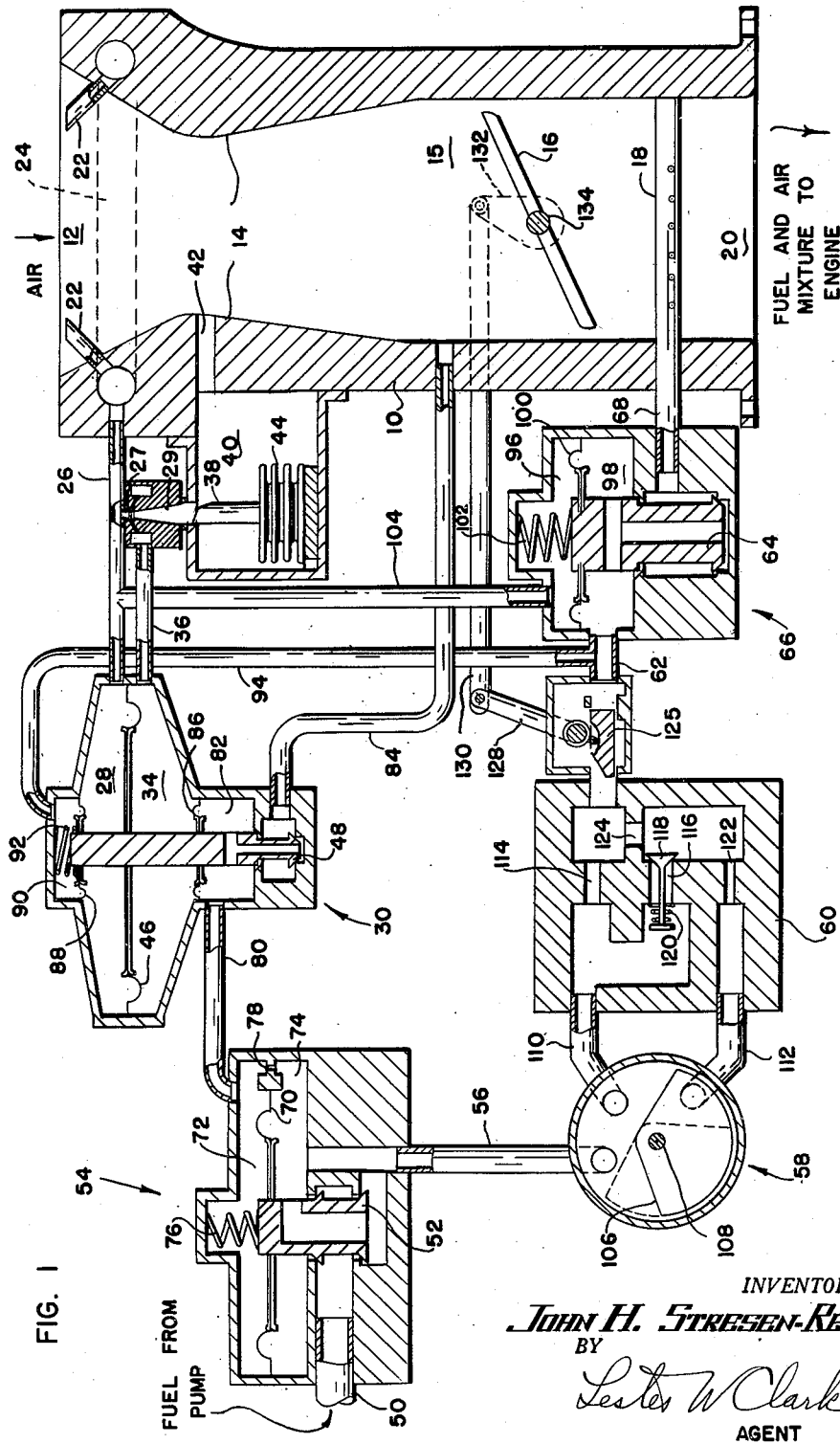

April 4, 1950  J. H. STRESEN-REUTER  2,502,602
FLOW RESTRICTING DEVICE
Filed July 20, 1944  2 Sheets-Sheet 1

INVENTOR.
John H. Stresen-Reuter
BY
Lester W Clark
AGENT

April 4, 1950   J. H. STRESEN-REUTER   2,502,602
FLOW RESTRICTING DEVICE

Filed July 20, 1944   2 Sheets-Sheet 2

INVENTOR.
John H. Stresen-Reuter
BY
Lester W Clark
AGENT

Patented Apr. 4, 1950

2,502,602

UNITED STATES PATENT OFFICE 2,502,602

FLOW RESTRICTING DEVICE

John H. Stresen-Reuter, Meriden, Conn., assignor, by mesne assignments, to Niles-Bement-Pond Company, West Hartford, Conn., a corporation of New Jersey Application July 20, 1944, Serial No. 545,808

5 Claims. (Cl. 73—213)

This invention relates to flow measuring apparatus, and particularly to apparatus for measuring the flow of air thru a carburetor adapted for use on an internal combustion engine.

A carburetor may be defined as a device for controlling the fuel-to-air ratio of the charge supplied to the cylinders of an internal combustion engine. In order to control the proportions of the charge, certain types of carburetors now in common use on aircraft utilize means for measuring the air flow, means for measuring the fuel flow, and means for comparing the air and fuel flows and for controlling the fuel flow so as to correct it if it is not in the correct proportion with respect to the air flow.

The most commonly used means for measuring the air flow is a Venturi meter. This meter is required to measure the air flow accurately over a much wider range of air flows than is usually required of Venturi meters in other applications. The meter must measure the air flow accurately at relatively low engine speeds, and also at the high engine speeds and power outputs encountered at take-off conditions.

In addition to the problems raised because of the wide range of air flows which the Venturi meter is required to measure, additional problems are presented because of the space and weight limitations imposed on an aircraft engine. The air induction system is required to be of the smallest possible size to admit the quantity of air necessary to run the engine at its maximum power output. Since the smallest part of the air induction system is the throat of the Venturi meter, it is required that the cross-sectional area of the Venturi throat be sufficiently large that it will not restrict the air flow so as to prevent operation of the engine at maximum power. It has been found that this requires a Venturi throat area equal to at least one-third of the cross-sectional area of the unrestricted portion of the air induction system. When the Venturi throat area is made equal to or greater than one-third of the cross section of the unrestricted portion of the air induction system, then the pressure differentials set up by the Venturi meter at low air flows are so small that the measuring forces produced do not change appreciably over a considerable range of air flow variation. It therefore becomes necessary to provide some means for amplifying the pressure differential produced by the Venturi meter to provide a measuring force having an appreciable rate of variation with changes in air flow.

The present trend in aircraft engine design is to increase the power ratings higher and higher. As the power ratings increase, the space limitations on the air induction system become comparatively more severe, and the required range over which the Venturi meter must operate increases. The need for a device which will accurately amplify a small pressure differential is consequently great and rapidly becoming greater.

It is, therefore, an object of the present invention to provide improved means for measuring the rate of flow of fluid.

Another object is to provide an improved device of the type shown in the co-pending application of Harold F. Twyman, Serial No. 486,599, filed May 11, 1943 which has matured into Patent Number 2,391,755.

A further object is to provide an improved device which responds to a flow of fluid caused by a first pressure differential to produce a higher pressure differential varying with the rate of flow of the fluid.

A further object is to provide improved means for measuring the rate of flow of air thru the induction system of an internal combustion engine.

Another object is to provide improved means for establishing a pressure differential varying with the rate of fluid flow including an orifice and a draft tube of gradually increasing diameter downstream from the orifice.

Other objects and advantages of my invention will become apparent from a consideration of the appended specification, claims and drawings, in which Figure 1 is a somewhat diagrammatic illustration of my invention as applied to a carburetor for an internal combustion engine.

Figure 2:
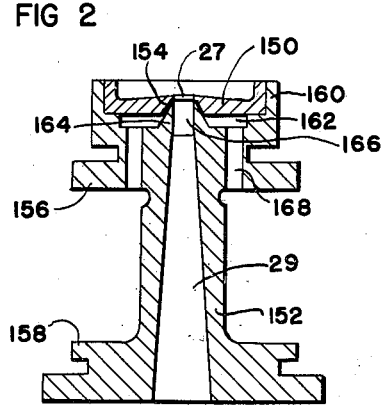
Figure 3:
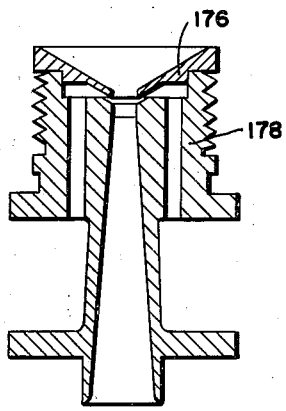
Figure 4:
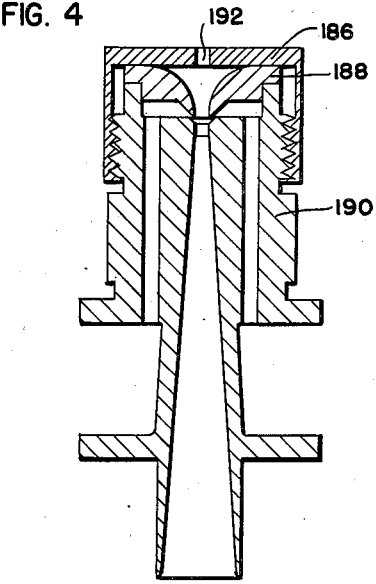

Figure 2 is a cross-sectional view of a preferred form of pressure differential producing means embodying the principles of my invention, and Figures 3 and 4 are cross-sectional views of modified forms of devices for producing a pressure differential varying with a rate of fluid flow in accordance with the principles of my invention.

Referring to the drawings, there is shown in Figure 1 a body 10 of a carburetor for an aircraft type internal combustion engine. Air enters the carburetor body 10 at an inlet 12 and flows thru a Venturi restriction 14 and a passage 15, past a throttle 16 and a fuel discharge nozzle 18 to an outlet 20. A supercharger may be provided between the outlet 20 and the intake manifold of the engine. In certain cases the supercharger may be upstream from the inlet 12, or two superchargers may be used, one in each place.

The Venturi restriction 14 produces a pressure differential between the inlet 12 and the throat of the restriction which varies substantially in accordance with the square of the velocity of the air passing thru the restriction. Since the cross-sectional area of the Venturi is constant, this pressure differential may be taken as a measure of the volume of air flowing thru the passage per unit time.

The pressure differential set up by the Venturi 14 is utilized to create a flow of air thru a secondary air passage. The air enters this secondary air passage thru a plurality of impact tubes 22, whose ends are open to receive the impact of the entering air. In the secondary air passage, the air flows from the impact tubes 22 thru a passage 24 interconnecting all the impact tubes, a conduit 26, an orifice 27, a draft tube passage 29, past a valve 38 into a chamber 40, and then thru a conduit 42 to the throat of Venturi 14.

The orifice 27 is a small cylindrical passage, which delivers air into the narrow end of the draft tube passage 29 of gradually increasing diameter. A pressure differential is thereby produced between the entrance to the orifice 27 and a point a short distance downstream from its entrance, which is proportional to but greater than the pressure differential between the air inlet 12 and the thoat of Venturi 14. This structure and its function are described more completely below in connection with Figure 2.

The valve 38 is operated by a sealed bellows 44 mounted in the chamber 40. The bellows 44 is fixed at one end, so that the position of the free end, to which valve 38 is attached, varies in accordance with the air pressure in the chamber 40. Bellows 44 is preferably filled with nitrogen or some other suitable temperature responsive fluid, so that the position of valve 38 varies not only with the pressure but also with the temperature of the air in the chamber 40, and hence with the density of that air.

The pressure differential produced by Venturi 14 varies with the velocity of the flowing air, rather than with the mass of air flowing per unit time. Since it is desired to obtain a measure of the mass of air flowing, rather than the velocity of the air, it is necessary to correct the metering apparatus for variations in air density. This is accomplished by the valve 38 and bellows 44. The valve 38 is moved toward open position as the air density increases and toward closed position as the air density decreases. If the volume of air flowing per unit time thru the passage 15 remains constant and its density decreases, then the mass of air is decreased, but the pressure differential set up by the Venturi 14 remains constant. However, the movement of valve 38 toward closed position causes the flow of air thru orifice 27 to decrease, so that the pressure drop between the entrance and the center of orifice 27 is decreased to compensate for the decrease in density. The pressure differential set up by the orifice 27 is thereby made to vary as a function of the mass of air flowing thru the passage 15 rather than its velocity.

The pressure differential across the orifice 27 is communicated thru conduits 26 and 36 to chambers 28 and 34 located on the opposite sides of a diaphragm 46 in a pressure meter 30. The diaphragm 46 is attached at its center to a valve 48. The force produced by the pressure differential at the orifice 27 acts in a downward or closing direction on valve 48.

The fuel enters the carburetor from a fuel pump or other source of fuel under superatmospheric pressure. It flows thru a conduit 50, a valve 52 in a pressure regulator generally indicated at 54, a conduit 56, a mixture control generally indicated at 58, a jet system 60, an idle valve 125, a conduit 62, a valve 64 in a second pressure regulator 66, and a conduit 68 to the fuel discharge nozzle 18.

The pressure regulator 54 includes a diaphragm 70 separating a pair of expansible chambers 72 and 74 and connected at its center to the valve 52. A spring 76 biases the valve 52 toward open position. A restriction 78 connects the chambers 72 and 74.

A portion of the fuel entering pressure regulator 54 flows thru chamber 74, restriction 78, chamber 72, a conduit 80, a chamber 82 in the pressure meter 30, past the valve 48, and thru a conduit 84 to the main air passage 15.

The pressure meter 30 includes a diaphragm 86 separating the chambers 34 and 82 and a diaphragm 88 separating the chamber 28 from a fourth expansible chamber 90. The valve 48 is biased toward closed position by a spring 92.

The chamber 90 is connected thru a conduit 94 to the fuel conduit 62 downstream from the jet system 60. The pressure in chamber 90 is therefore the same as that in the fuel line downstream from the jet system. The pressure in chamber 82 is the same as that in chamber 72 of pressure regulator 54.

The position of diaphragm 70 and valve 52 is determined by the balance between the spring 76 plus the pressure in chamber 72 acting in a valve opening direction and the pressure in chamber 74 acting in a valve closing direction. If the balance between these forces is upset, the diaphragm 70 and valve 52 move until the balance is restored. Therefore the pressure in chamber 72 is a measure of the pressure in chamber 74, which is substantially the same as the pressure on the upstream side of the jet system 60.

For any given constant cross-sectional area of the fuel passages thru the jet system 60, the pressure differential across it is a measure of the fuel flow thru it. This pressure differential, or rather a smaller pressure differential which is a measure of the pressure differential across the jet system, is applied thru the diaphragms 86 and 88 of pressure meter 30 to the valve 48, on which it acts in an opening direction.

From the foregoing, it may be seen that the valve 48 is positioned in accordance with the balance between two forces, one of which varies in accordance with the mass of air entering the carburetor, and the other in accordance with the mass of fuel entering the carburetor. Furthermore, the valve 48 controls the mass of fuel entering the carburetor, since it controls the pressure in chamber 82. The pressure in the chamber 82 is transmitted to chamber 72 of pressure regulator 54 where it controls the position of valve 52 and hence the pressure on the upstream side of the jet system 60.

The pressure regulator 66 operates to maintain a substantially constant pressure on the downstream side of the jet system 60 and thereby to prevent variations in pressure at the fuel discharge nozzle 18, which may be due to operation of the throttle or to variations in engine speed, from reaching the downstream side of the jet system and affecting the fuel flow.

The pressure regulator 66 includes a pair of expansible chambers 96 and 98 separated by a flexible diaphragm 100, which is attached at its center to the valve 64. A spring 102 biases the valve 64 toward closed position. The chamber 96 is connected thru a conduit 104 to the conduit 26 and thence thru the passage 24 and impact tubes 22 to the air entrance 12. The chamber 98 is connected to the conduit 62.

The mixture control 58 includes a disc valve 106 fixed on a shaft 108. The disc valve 106 controls the flow of fuel thru ports opening into conduits 110 and 112 which lead into the jet system 60. When the disc 108 is in the position illustrated in full lines in the drawing, fuel can flow to the jet system only thru the conduit 110. This full line position of the disc valve 106 is known as the "lean" position of the mixture control 58. When the disc valve 106 is in the dotted line position shown in the drawing, the fuel can flow thru both the conduits 110 and 112. The dotted line position of disc valve 106 is termed the "rich" position of the mixture control. The disc valve 106 can also be moved to a "cut-off" position wherein it cuts off the flow thru both conduits 110 and 112.

The conduit 110 conducts fuel either thru a fixed restriction or jet 114, or thru a restriction 116 controlled by a valve 118 biased to closed position by a spring 120. The conduit 112 conducts fuel to a fixed restriction 122. Fuel flowing thru the restrictions 116 and 122 also flows thru another restriction 124 which limits the total flow thru restrictions 116 and 122.

The valve 118 is normally closed, but opens at high pressure differentials across the jet system to increase the fuel-to-air ratio under heavy load conditions.

At very low air flows, such as are encountered under idling conditions, the pressure differential set up by the Venturi 14 tends to be erratic, and is not a reliable indication of the volume of air entering the engine. Provision is made to control the fuel flow directly in accordance with the throttle position at such times. The spring 92 in the pressure meter 30 acts on valve 48 in a closing direction. When the differential pressure acting on diaphragm 46 is small, as under low air flow conditions, the spring 92 becomes the predominating force acting on valve 48. A closing movement of valve 48 causes an increase in the fuel flow thru the main fuel line, since the closure of valve 48 increases the pressure in chamber 82 of pressure meter 30 and hence in chamber 72 of pressure regulator 54. Furthermore, the spring 76 of pressure regulator 54 biases valve 52 in an opening or fuel flow increasing direction.

The idle valve 125 is pivotally attached to a lever 128, whose opposite end is connected by a link 130 to an arm 132 fixed on the shaft 134 of throttle 16. The idle valve is normally wide open when the throttle is beyond a range of positions near its closed position, usually termed the idling range. As the throttle moves into the idling range, thereby decreasing the air flow, the idle valve 125 moves toward closed position. At the same time, the springs 92 and 76 cause operation of valve 52 in an opening direction. The valve 52 is thereby opened sufficiently so that its restrictive effect on the fuel flow is less than that of the idle valve 125. Therefore the fuel flow under idling conditions is controlled primarily by the valve 125 in accordance with the position of the throttle, and not by the pressure meter 30 in accordance with the mass of air entering the engine.

While I have illustrated a particular type of carburetor, it will be appreciated by those skilled in the art that my invention may be applied with equal facility to other types of carburetors. The carburetor illustrated may, for example, be modified by omitting the pressure regulator 54 and placing the valve 48 of the pressure meter 30 directly in the fuel line between the pump and the mixture control 58.

*Figure 2*

There is shown in Figure 2 an orifice and draft tube construction similar to that shown more diagrammatically at 27 and 29 in Figure 1. The construction shown in Figure 2 consists of two pieces, an orifice plate 150 and a draft tube 152. The upstream surface of the orifice plate 150 is conical, with the orifice 27 opening at the center of the cone and forming a short cylindrical passage thru the plate 150. The downstream side of the orifice plate 150 is countersunk about the orifice 27, as indicated at 154.

The draft tube 152 is provided with upper and lower mounting flanges 156 and 158. The upper end of the tube 152 is provided with an upwardly projecting peripheral flange 160 to receive and locate the orifice plate 150. The upper surface of the tube 152 is recessed to form a chamber 162 under the orifice plate 150. At the center of the chamber 162, the upper end of tube 152 is provided with a conical projection 164 which extends into, but does not contact, the countersunk portion 154 of the orifice plate 150. The tube 152 is provided with a central cylindrical bore 166 which extends downwardly a short distance from the tip of the conical projection 164. The cylindrical bore 166 opens into the draft tube passage 29, of gradually increasing diameter, which extends downwardly thru the tube 152 to its lower end. In other words, the restriction device of Fig. 2 may be said to consist of a cylindrical passage (including both orifice 27 and bore 166) leading to a flaring draft tube 29, with a lateral opening into the cylindrical passage to permit an external connection of a device functioning in proportion to the pressure therein.

The conical upper surface of the plate 150 provides a sharp edge for the orifice 27 so that the air entering that orifice flows in substantially parallel lines. This parallel flow continues for a short distance before the usual disturbing effects due to the surface of the tube cause an uneven velocity distribution in the orifice. The small opening between the upper end of the conical projection 164 and the countersunk portion 154 of the plate 150 provides a means for communicating the pressure within the orifice 27 at a point therein where the velocity distribution is uniform. This pressure is communicated thru the space to the aperture 162, which is in turn connected thru passages 168 to the conduit 36 of Figure 1. The space on the upstream side of orifice 27 is connected to the conduit 26 of Figure 1.

It has been found essential, in order to provide uniform velocity distribution thru a flow pressure differential responsive device of the type shown in Figure 2, to make the distance between the entrance to the orifice and the point at which the pressure is measured equal to not more than 1/3 of the internal diameter of the orifice. The minimum dimension which may be used is determined more by the characteristics of the material and the need for rigidity rather than by any law or characteristic of fluid flow. For example, in one embodiment of my invention, the internal diameter of the orifice is approximately .102 inch, and the distance between the orifice entrance and the point at which the pressure is measured within the passage is .028 inch.

The width of the opening thru the walls of the passage is approximately .003 inch.

Figure 3

There is illustrated in Figure 3 a modified form of orifice and draft tube construction which may be used in place of that shown in Figure 2. The form shown in Figure 3 differs from that in Figure 2 chiefly in that the orifice plate is provided with an inwardly tapering conical surface as contrasted to the projecting conical surface of Figure 2. The draft tube 178 is also provided with a countersunk portion at its upper end instead of the projecting cone 164 of Figure 2.

Figure 4

The form of the device shown in Figure 4 has three pieces, a first orifice plate 186, a second orifice plate 188, and a draft tube 190. The construction of the draft tube 190 is substantially the same as that of the draft tube 178 of Figure 3. The second orifice plate 188 has the orifice formed with its internal diameter decreasing in the direction of flow along a substantially parabolic curve, somewhat similar to the entrance to a Venturi. The orifice plate 186 is in the form of a cap which is internally threaded so that it may be screwed on to external threads on tube 190. The orifice 192 thru the plate 186 is a short straight-sided cylindrical orifice. The device of Figure 4 does not have the dimensional limitations of the device shown in Figure 2, but it is more complicated structurally.

While I have illustrated and described certain preferred embodiments of my invention, other modifications thereof will readily occur to those skilled in the art, and I therefore intend my invention to be limited only by the appended claims.

I claim as my invention:

1. A flow restricting device for use in apparatus for measuring flow through a passage, comprising an elongated, generally tubular member forming a portion of said passage, said member having a central conical projection at its upstream end and a bore extending axially of said projection, said bore comprising a first portion of constant diameter and a second portion adjoining the downstream end of said first portion and having a diameter gradually increasing in the direction of flow, and a plate member extending across said passage upstream from said tubular member, said plate member having its upstream surface in the form of a projecting truncated cone, and a central aperture of substantially the same diameter as said first portion of the bore in said tubular member, the downstream surface of said plate member being countersunk around said aperture to receive the conical projection on the upstream end of said tubular member, said members having cooperating surfaces for establishing their relative locations so that the conical projection on said tubular member extends into but does not engage the countersunk downstream surface of said plate member, with said aperture aligned with said bore, so as to form an opening between said countersunk surface and said conical projection.

2. A flow restricting device for use in apparatus for measuring flow through a passage, comprising an elongated, generally tubular member forming a portion of said passage, said member having an axially extending bore comprising a first air conduit of constant diameter and a second air conduit adjoining the downstream end of said first conduit and having a diameter gradually increasing in the direction of flow, and a plate member extending across said passage upstream from said tubular member, said plate member having a cylindrical orifice of substantially the same diameter as said first conduit, the thickness of said plate member at said orifice being less than one-third of the diameter of said orifice, said members having cooperating surfaces for establishing their relative locations so that the upstream end of said bore is spaced from the downstream end of said orifice, thereby forming a lateral opening into said passage between said members.

3. A flow restricting device for use in apparatus for measuring flow through a passage, comprising an elongated, generally tubular member forming a portion of said passage, said member having a central conical projection at its upstream end and a bore extending axially of said projection, said bore comprising a first portion of constant diameter and a second portion adjoining the downstream end of said first portion and having a diameter gradually increasing in the direction of flow, and a plate member extending across said passage upstream from said tubular member, said plate member having its upstream surface in the form of a projecting truncated cone, and a central aperture of substantially the same diameter as said first portion of the bore in said tubular member, the thickness of said plate member at said aperture being less than one-third of the diameter of said aperture, the downstream surface of said plate member being countersunk around said aperture to receive the conical projection on the upstream end of said tubular member, said members having cooperating surfaces for establishing their relative locations so that the conical projection on said tubular member extends into but does not engage the countersunk downstream surface of said plate member, with said aperture aligned with said bore, so as to form an opening between said countersunk surface and said conical projection.

4. A flow restricting device for use in apparatus for measuring flow through a passage, comprising structure having an elongated, generally tubular member forming a portion of said passage, said member having at its upstream end a conical projection about a bore extending axially thereof, said bore comprising a first portion of constant diameter and a second portion adjoining the downstream end of said first portion and having a diameter gradually increasing in the direction of flow, and a plate member extending across said passage upstream from said tubular member, said plate member having an outwardly tapering conical surface on its upstream side and a central aperture of substantially the same diameter as said first portion of the bore in said tubular member, the downstream surface of said plate member being countersunk around said aperture to admit the conical projection on the upstream end of said tubular member, said members having cooperating surfaces for establishing their relative locations so that the projection on said tubular member extends into but does not engage the countersunk surface of said plate member, with said aperture aligned with said bore, so as to form an opening between said countersunk surface and said projection.

5. Fluid flow pressure differential responsive means, comprising structure having a passage for the flowing fluid, there being a restriction in said passage having a cylindrical bore with a sharp-edged opening and a length substantially greater than its diameter, and a draft tube of gradually increasing diameter abutting said restriction and receiving fluid from said cylindrical bore, and means responding to the difference between the pressure in said passage at the upstream entrance to said opening and the pressure at a point in said bore spaced from said entrance by a distance equal to not more than one-third of the diameter of said opening.

JOHN H. STRESEN-REUTER.

REFERENCES CITED

The following references are of record in the file of this patent:

UNITED STATES PATENTS

| Number | Name | Date |
|---|---|---|
| 790,888 | Ferris | May 30, 1905 |
| 1,419,798 | Bacharach | June 13, 1922 |
| 1,850,030 | Pardoe | Mar. 15, 1932 |
| 1,980,672 | Engel | Nov. 13, 1934 |
| 2,332,716 | Hess | Oct. 26, 1943 |
| 2,349,775 | Udale | May 23, 1944 |
| 2,361,227 | Mock | Oct. 24, 1944 |
| 2,361,228 | Mock | Oct. 24, 1944 |

FOREIGN PATENTS

| Number | Country | Date |
|---|---|---|
| 135,557 | Great Britain | Dec. 4, 1919 |